2,823,109
PROCESS FOR MANUFACTURING HIGH GRADE PIG IRON

Koji Sudo, Tokyo, Japan

Application October 7, 1954, Serial No. 460,909

1 Claim. (Cl. 75—41)

This invention relates to a process for manufacturing high grade pig iron.

An object of the present invention is to obtain a high grade pig iron comparable to the charcoal iron in mass production.

Another object of the present invention is to obtain a high grade pig iron economically by using powdered coke or powdered coal.

Further objects and advantages of the present invention will become apparent from the following description.

In the comparison of coke iron with charcoal pig iron in their content of ferrous oxide, even when said two types of iron have similar chemical compositions as determined in the ordinary analysis, the FeO content of the latter iron always ranges from one-tenth to several tenths that of the former. Such an extremely low content of ferrous oxide is one of the important factors for the excellent inherent properties of charcoal pig iron. This fact is considered to be ascribed to the difference between the chemical reaction in charcoal furnaces and that in the coke furnace.

According to the present invention, the ultimate cause of the said difference has been studied, and further closely investigated. With the result, it has been firmly ascertained that objects of this invention can be attained as follows: First the briquettes are formed from a specific finely-divided ore and pulverized carbonaceous materials such as coke and coal, by using quick lime as a binding agent, and the reduction of the said ore by the powdered carbonaceous material contained in those briquettes is adapted to be accelerated as the case with charcoal, and then these briquettes are dried and hardened in a suitable thermal treatment, after which these dried briquettes appropriately sintered in a desired melting furnace in its furnace top, subsequently powdered iron ore being directly reduced by the solid carbonaceous material in those briquettes. The indirect reduction due to CO gas is likewise carried out for a quick accomplishment of the reduction, in which case the pig iron is melted while the acidity of the slag in the furnace is kept at a certain degree. By further reaction with said slag a slight amount of FeO solidly dissolved in molten pig iron is converted into ferrous oxide silicate, which is then reduced by the surrounding carbonaceous material to pure iron, said iron thus obtained being transferred into the molten iron. Thus a high grade pig iron can be obtained containing an extremely slight amount of FeO, as in the case of charcoal iron, by using powdered coke or pulverized coal. Thus, the feature of the present invention lies in that finely-divided iron ore of a fineness less than about 10 mm. and carbonaceous material such as coke, coal and the like pulverized to a fineness less than about 7 mm. are intimately mixed, by using quick lime as a binding agent, so that the powdered carbonaceous material and fine ore may come in contact with each other uniformly and intimately, and shaped into briquettes of a desired shape having increased contact or reaction surfaces. Thus the reduction of the fine iron ore with the powdered coal in said briquettes is adapted to be accelerated as the case with charcoal, and then these briquettes are previously hardened at a temperature between 100° C. and 200° C. Thereafter, the briquettes are charged in a specially designed furnace, or a melting furnace capable of keeping the temperatures in the top of the furnace, so high as enabling them to be sintered and then melted in its melting zone. The type of melting furnace actually employed in the present invention has a construction as described below: For instance, in the usual melting furnace, the height of the furnace is about 4 to 5 times the diameter of furnace, and accordingly the temperature at the top of furnace is generally less than 200° C. e. g. approximately 150° C. In the present invention, however, the furnace to be used has a construction of a relatively low furnace height, approx. 2½ to 3 times the furnace diameter, for the reason that the briquettes are first to be sintered in the top of the furnace and consequently the furnace temperature is required to be elevated to the sintering temperature for the briquettes, for instance, to approximately 600° to 800° C. In a furnace of such a construction, the briquettes are adapted to be charged in the top of which briquettes are sintered. The briquettes are reduced directly to iron ore in the furnace by the solid carbonaceous material contained therein, while the indirect reduction due to CO gas is also effected. Besides, in this instance, as the reduction is effected through the permeation and diffusion, it is completed rapidly. Thus, the reduced iron is melted down in the melting zone of the furnace under low alumina, but high acid slag, i. e. under the condition, wherein the equilibrium of slag compositions is given by the following rate: $SiO_2$=40 to 60%, $CaO+MnO+MgO+FeO$=35 to 20% and $Al_2O_3+Fe_2O_3$=20 to 35%. In this case, FeO solid solved in molten iron is converted into ferrous oxide silicate, by the slag reaction and the silicate is further converted to pure iron by carbonaceous material, which is surrounding the former. The pure iron thus reduced can be transferred in the molten iron. Further, the molten iron thus obtained according to the present invention can be charged in a rotary desulfurizing furnace, mixed with quick lime and pyrite cinder in order to produce a basicity thereof higher than 2.3 and then desulfurized effectively, if desired, in skillful utilization of the reaction between the solid solved slag adhered to the furnace wall and the molten iron in the furnace bottom, while the rotary desulfurizing furnace is rotated at a temperature of about 1400° to 1450° C.

In the present invention, in order to accelerate the reaction of solid carbonaceous material, such as coal, coke and the like, as in the charcoal reaction, with the purpose of lowering the apparent specific gravity of carbon powder, such as powdered coal or coke, below the specific gravity of charcoal, the specific gravity of which charcoal is 1/3.5 of that of coke, the solid carbonaceous material is pulverized to less than about 7.0 mm. in the diameter of carbon grains and similarly the iron ore, manganic ore and the like are likewise pulverized correspondingly to approximately 10.0 mm. in diameter for the largest grain size. The powdered coal and pulverized ore are thoroughly mixed and intimately blended with quick lime, the binding agent for obtaining uniform and intimate contact between the powdered coal and pulverized ore grains. Thus the contact surface between the two ingredients, that is, the surface reaction is increased and briquettes of an appropriate size, for instance, of a fist size are shaped. Thereafter, the briquettes are dried at an appropriate temperature, for instance, approximately 100 to 200° C., by utilizing the heat of flues of the melting furnace and the like, or by other methods, and hardened to give a sufficient strength for the conveyance and charging in the furnace. Then, these briquettes are charged in the specific melting furnace as described above, and sintered first in the furnace top. In consequence, the briquettes will not disintegrate thereafter even if their water of crystallization is evaporated. Thus, the carbon included in the briquettes urges direct reduction on the finely-divided iron ore by heating in the reduction zone and the heating zone of the furnace and is changed into CO, which further reduces the ore indirectly and becomes $CO_2$. The reduction is due to permeation and diffusion, and is effected exceedingly rapidly on the structure of briquettes. Besides, as the endothermic reaction of CO is supplemented by the heat from the exothermic reaction of $CO_2$, no extreme rise of temperature takes place at the time of reduction, and the reduction is accelerated at around 1000° C. as in the case with charcoal. The reduced iron absorbs the remaining carbon and becomes pig iron, and melts. Thereafter, as in case of the charcoal iron blast furnace, the molten iron gathers at the bottom of the furnace and is tapped from the furnace through the tapping hole, while the slag is further kept at high acidity and low alumina in the melting zone, the equilibrium of the slag compositions being controlled as follows: $SiO_2 = 40$ to 60%, $$CaO + MnO + MgO + FeO = 35 \text{ to } 20\%$$

and $Al_2O_3 + Fe_2O_3 = 20$ to 15% (the basicity of the slag being from 0.23 to 0.6). The FeO content of the pig iron can be decreased to less than 0.01%. Further, when the desulfurization has to be carried out, the molten iron is charged, as it is, into a rotary desulfurizing furnace, wherein it is heated with addition of quick lime and pyrite cinder, while the furnace is being rotated, the basicity of slag being held high (the basicity is above 2.3), in which case, as the slag is highly basic, the heating temperature is limited at approx. 1400 to 1450° C. Accordingly, the slag does not melt and forms solid material, which adheres to the furnace wall. The molten iron is desulfurized then by the mutual reaction with the solid slag.

The accompanying drawing is intended to illustrate diagrammatically how large a difference exists between chemical reactions of both types of reduction, the one with the usual charcoal furnace and the other with the coke furnace, by comparing the results of the experiments effected for one hour, in which iron oxide was reduced in the charcoal furnace and in the coke furnace respectively, of which:

The explanation is made with reference to the accompanying drawing.

Figure 1:
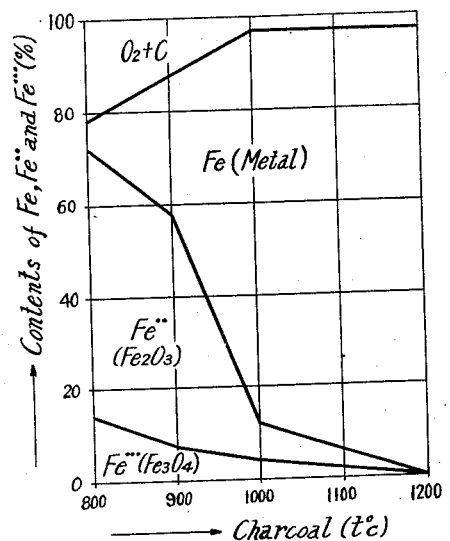
Fig. 1 illustrates the reduction of iron oxide due to charcoal.
Figure 2:
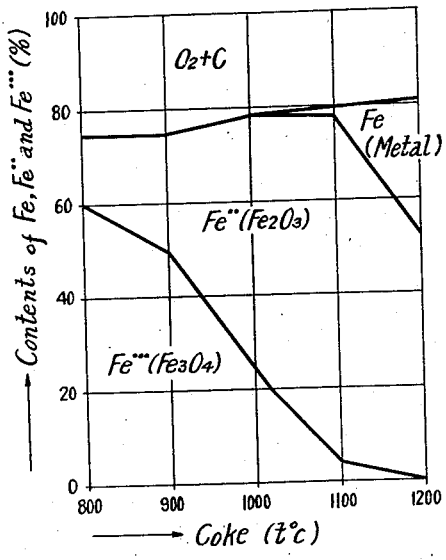
Fig. 2 is a view showing the state of reduction due to coke.

In the accompanying drawing, Fig. 1 shows the reaction which takes place in the charcoal blast furnace, while Fig. 2 represents the reaction to be taking place in the coke blast furnace. Both of them represent the experimental examples for comparison of the state of reaction occurring at a temperature of approximately 800 to 1200° C. in both cases. The state of charcoal furnace as shown in Fig. 1 is such that, as the reactivity of charcoal with respect to the direct reduction is remarkably higher than coke, approx. 90% of FeO may be reduced to metallic iron at 1000° C., while in the coke furnace FeO only commences to be reduced to metallic Fe gradually at the same temperature of 1000° C. Further, in addition thereto, the iron in the iron ore is reduced to iron as in the formula:

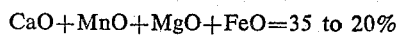

Around the metallic Fe, a minute amount of FeO exists, which FeO shows a remarkable tendency of dissolving solidly in the metallic iron from a temperature of around 900° C., while the said solid solubility increases more and more as the temperature rises. As a result, content of FeO in the coke pig iron increases remarkably.

Therefore, in order to prevent the transference of FeO in Fe, a largest possible amount of FeO has to be reduced to metallic Fe at a temperature of approximately 1000° C. According to the present invention, as about 90% of FeO is reduced to metallic Fe first at a temperature of around 1000° C. as in the charcoal blast furnace, the rate of FeO dissolving in Fe is far lower as compared with the coke pig iron. Namely, high grade pig iron can be obtained which contains an extremely minute content of FeO.

The essential features of the present invention are as described in the following:

(1) The manufacture of iron can be carried out with such low grade ores such as iron sand, pyrite cinder and the like alone.

(2) The consumption of reducing agent can be decreased to a half as compared with that in the usual process, because both direct and indirect reductions are used. Therefore, the heat consumption is curtailed and the time necessary from the charging to tapping is an extremely short interval of time. For instance, 2 to 3 hours is sufficient; and in comparison with the usual blast furnace, a remarkable increase, for instance, approximately 3 times the production capacity can be obtained.

(3) Since FeO content in the pig iron is minute as in the case with the excellent charcoal pig iron, all the cast iron and steel made from said pig iron demonstrate excellent inherent properties.

The invention is further described in the following example, which is illustrative, but not limitative thereof.

*Example*

80% (by volume percent) of iron ore containing e. g. about 60 to 70% iron finely-divided to a fineness below 10 mm. and 10% (by volume percent) of powdered coke pulverized to a fineness below 7 mm. were kneaded with 10% (by volume percent) of a binding agent consisting of quick lime (with addition of water in a suitable amount) in order to ensure intimate mixing and contacting of powdered iron ore with coke grains. From the resulting mixture, briquettes of a fist size were shaped. Those briquettes were then heated to harden.

The briquettes thus obtained preparatorily were charged into the predetermined melting furnace with coke for heating, which melting furnace has a furnace height lower than that of the usual melting furnace; for instance, the inner diameter of the tuyere level was 32 inches, the tuyere area was 8.35 square inches (the number of tuyeres is 4), the height from the tuyere level to charging floor was around 6 feet. The briquettes were charged into the melting furnace through the top of the furnace. In this case, the briquettes were sintered at around 800° C. in the top of the furnace, and then gradually fell down to the reduction zone and heating zone, where the direct reduction occurred due to the solid carbon in the briquettes and then the indirect reduction due to CO gas took place. Thus, the reduction was completed rapidly due to permeation and diffusion. Further, the reduced iron absorbed excess iron and melted down in the melting zone due to the resulting lowering of the melting point, while the equilibrium of the slag compositions was given, for instance, by the following rate: $SiO_2 = 55\%$, $CaO + MnO + MgO + FeO = 30\%$ and

in order to keep the slag strong acid.

FeO slightly dissolving in the molten iron was converted to ferrous oxide silicate, which silicate was further reduced, by the carbon surrounding it, to pure iron, and entered molten iron and the FeO contained in iron became extremely minute.

The recovery of iron from the iron ore in this furnace was about 95%. For instance, when the blast is started at noon, then at 3 p. m. 2.5 to 3 tons of molten iron was obtained, and the fuel consumption was kept low.

Then, when desulfurization is intended to be effected, the molten iron is charged directly in the rotary desulfurizing furnace. In order to keep the basicity of the slag above 2.3, burnt lime and pyrite cinder are added thereto and heated at a temperature of about 1400 to 1450° C., while the furnace is rotated. Thus the solid solved slag does not melt but clings to the furnace wall, while molten iron remains in the furnace bottom. In this case, the desulfurization can be carried out satisfactorily by the reaction between the slag and molten iron in the bottom thereof, i. e. between solid and liquid phases, as in the two liquid phases.

What I claim:

A process for manufacturing high grade pig iron, which comprises the steps of shaping briquettes of desired size, in which powdered carbonaceous material and finely-divided ore have been brought into contact with each other intimately, said iron ore being of a fineness below approximately 10 mm. and said carbonaceous material being of a fineness below approximately 7 mm., by using quick lime as a binding agent, such that the reduction of powdered carbonaceous material is accelerated by increasing thereby the contact surface or reactional surface of both constituents; drying the briquettes thus obtained; sintering said briquettes first in the top of a melting furnace, and then reducing the iron ore in the furnace by means of said carbonaceous material in the aforesaid briquettes, while converting the reduced iron in the melting zone of the furnace into molten pig iron under a special low alumina, high acid slag in a state wherein the equilibrium of slag compositions is represented by the following proportions:

$$SiO_2 = 40\text{–}60\%, \quad CaO+MnO+MgO+FeO = 35\text{–}20\%$$
$$\text{and} \quad Al_2O_3+Fe_2O_3 = 20\text{–}15\%$$

References Cited in the file of this patent

UNITED STATES PATENTS

| | | |
|---|---|---|
| 145,462 | Taylor | Dec. 9, 1873 |
| 2,100,086 | Paschke et al. | Nov. 23, 1937 |
| 2,684,897 | Diettrich | July 27, 1954 |

FOREIGN PATENTS

| | | |
|---|---|---|
| 503,925 | Great Britain | Apr. 14, 1939 |